(12) United States Patent
Liao et al.

(10) Patent No.: US 7,350,928 B2
(45) Date of Patent: Apr. 1, 2008

(54) PROJECTION DISPLAY SYSTEM

(75) Inventors: Chia-Chen Liao, Hsinchu (TW); Yi-Hao Kang, Hsinchu (TW); Chu-Ming Cheng, Hsinchu (TW)

(73) Assignee: Young Optics Inc. (TW)

( * ) Notice: Subject to any disclaimer, the term of this patent is extended or adjusted under 35 U.S.C. 154(b) by 261 days.

(21) Appl. No.: 11/262,924

(22) Filed: Nov. 1, 2005

(65) Prior Publication Data

US 2006/0103812 A1 May 18, 2006

(30) Foreign Application Priority Data

Nov. 15, 2004 (TW) ............................... 93135165 A

(51) Int. Cl.
| | |
|---|---|
| G03B 21/28 | (2006.01) |
| G03B 21/26 | (2006.01) |
| G03B 21/20 | (2006.01) |
| G02F 1/00 | (2006.01) |
| H04N 5/74 | (2006.01) |
| G02B 27/14 | (2006.01) |
| G02B 27/12 | (2006.01) |
| G02B 27/28 | (2006.01) |
| G02B 27/30 | (2006.01) |
| G02B 3/02 | (2006.01) |
| G02B 5/04 | (2006.01) |
| G02B 5/30 | (2006.01) |

(52) U.S. Cl. ........................... 353/81; 353/20; 353/33; 353/37; 353/99; 353/102; 359/496; 359/638; 359/640; 359/641; 359/720; 359/833; 359/837; 348/759

(58) Field of Classification Search ................ 353/81, 353/33, 37, 98, 99, 102, 20; 359/638–640, 359/641, 678, 720, 831, 833–837, 496, 631; 349/57; 348/750, 756, 757, 758, 759, 771
See application file for complete search history.

(56) References Cited

U.S. PATENT DOCUMENTS

| | | |
|---|---|---|
| 5,309,188 A | 5/1994 | Burstyn |
| 5,552,922 A | 9/1996 | Magarill |
| 6,672,724 B1 * | 1/2004 | Peterson et al. ............... 353/81 |
| 6,719,426 B2 * | 4/2004 | Magarill et al. .............. 353/20 |
| 2003/0123162 A1 * | 7/2003 | Penn .......................... 359/833 |

* cited by examiner

*Primary Examiner*—Rochelle Blackman
(74) *Attorney, Agent, or Firm*—MH2 Technology Law Group LLP

(57) ABSTRACT

A projection display system comprises an illumination device, a prism assembly, a projection lens and a reflective light valve. The prism assembly has a first light incident surface, a first light emitting surface and a second light emitting surface. The first light emitting surface is an optical curved surface. An illumination beam is incident on the light valve after it enters the prism assembly from the first light incident surface. A modulated beam is generated after it is processed through the light valve. Finally, the modulated beam is projected into the projection lens through the prism assembly. Because a surface of the prism assembly is set to be an optical curved surface to replace a lens in the projection lens or the illumination device, a back focal length of the system is shortened and the projection lens or the illumination device is simplified.

17 Claims, 13 Drawing Sheets

PROJECTION DISPLAY SYSTEM

BACKGROUND OF THE INVENTION

1. Field of the Invention

The present invention relates to a projection display system, and more particularly to a projection display system with a reflective light valve.

2. Description of Related Art

A conventional projection display system is to use a light beam emitted from a light source to converge on one or more light valves to allow the beam to carry signals of images, and be then projected onto a screen to form images through a projection lens. However, because a multimedia presentation prevails, for attaining to a convenient carrying, the projection display system and device tend to be light, thin, short and small, a single reflective light valve is adopted in a general display device for presentation use.

A projection display system 10 with a single reflective light valve disclosed in U.S. Pat. No. 5,552,922, as FIG. 1 shows, has a light source 11, a prism 12, a light valve 13 and a projection lens 14, in which the prism 12 has two planes 121 and 122 parallel to each other. The light valve 13 and the projection lens 14 are disposed adjacent to the planes 121 and 122 of the prism 12. The light valve 13 is a digital micro-mirror device (DMD). The light source 11 provides an illumination beam incident into the prism 12, and the beam is then projected on the light valve 13 by means of total reflection. Thereafter, the beam reflected from the light valve 13 is passed through the prism 12 and enters the projection lens 14 to project onto a screen (not shown) to form images. Because the prism 12 is installed between the light valve 13 (i.e. an image formation surface) and the projection lens 14 (i.e. a lens system) in the above-mentioned system, a back focal length (BFL) defined a distance from the last surface of the lens system to the image formation surface thereof is caused to be large. And, if the back focal length is lager, an aberration of the images formed in the projection lens 14 will be caused to be large, and a larger size of the projection lens 14 will be needed such that the size of the whole system cannot be reduced.

Another projection display system 10 with a single reflective light valve disclosed in U.S. Pat. No. 5,309,188, as FIG. 2 shows, has a coupling prism assembly 22 installed between a light valve 23 and a projection lens 24, the coupling prism assembly 22 consists of an isosceles right triangle prism 221 and a wedge prism 222. One side of the wedge prism 222 is adjacent to the hypotenuse of the isosceles right triangle prism 221. The light valve 23 is installed adjacent to one leg of the isosceles right triangle prism 221. A light beam provided from a light source 21 is incident on the light valve 23 after passed through the coupling prism assembly 22. The light beam reflected from the light valve 23 is reflected via the hypotenuse of the isosceles right triangle prism 221 and then projected into the lens 24, and images are finally displayed on a screen (not shown). Although the light valve 23 and the lens 24 are perpendicularly disposed in the system mentioned above, the coupling prism assembly 22 still causes that a back focal length cannot be shortened effectively.

It is concluded that the problems, that the back focal length is still too long and the volume of the projection lens is too large, still exists in the projection display system with a current single plate reflective light valve. According, the present invention is proposed to solve such kinds of problems.

SUMMARY OF THE INVENTION

One object of the present invention is to provide a projection display device utilizing a collimating means installed between a reflective light valve and a prism assembly to attain to the reductions of a back focal length and the volume of a projection lens.

Another object of the present invention is to provide a projection display device utilizing a light emitting surface of a prism assembly to be installed as an optical curved surface to attain to the reductions of a back focal length and the volume of a projection lens.

Still another object of the present invention is to provide a projection display device utilizing a light emitting surface of the prism assembly adjacent to an image formation set to be installed as an optical curved surface to simplify the image formation set.

Still another object of the present invention is to provide a projection display device utilizing a light incident surface of a prism assembly adjacent to an illumination device to be installed as an optical curved surface to simplify the illumination device.

For attaining to the objects mentioned above, a projection display device according to the present invention comprises an illumination device, a light valve and a projection lens with a prism assembly and an image formation set. The prism assembly has a first light incident surface, a first light emitting surface and a second light emitting surface, the first light emitting surface is a surface of a lens, and the light valve and the image formation set are respectively installed adjacent to the first light emitting surface and the second light emitting surface. An illumination beam is incident on the light valve after it enters the prism assembly via the first light incident surface to generate a modulated beam. Finally, the modulated beam is passed through the prism assembly again to project into the image formation set. Because the surface of the prism assembly is installed as the surface of the lens to replace the lens in the image formation set or the illumination device, the back focal length of the system can be reduce_and the image formation set or the illumination device can be simplified.

BRIEF DESCRIPTION OF THE DRAWINGS

The present invention is more fully understood by reference to the following description and accompanying drawings, in which.

DETAILED DESCRIPTION OF THE EMBODIMENTS

Four embodiment are brought here to explain the technological means and other effects for attaining to the objects of the present invention mentioned above accompanying the drawings as the followings:

The First Embodiment

Figure 1:
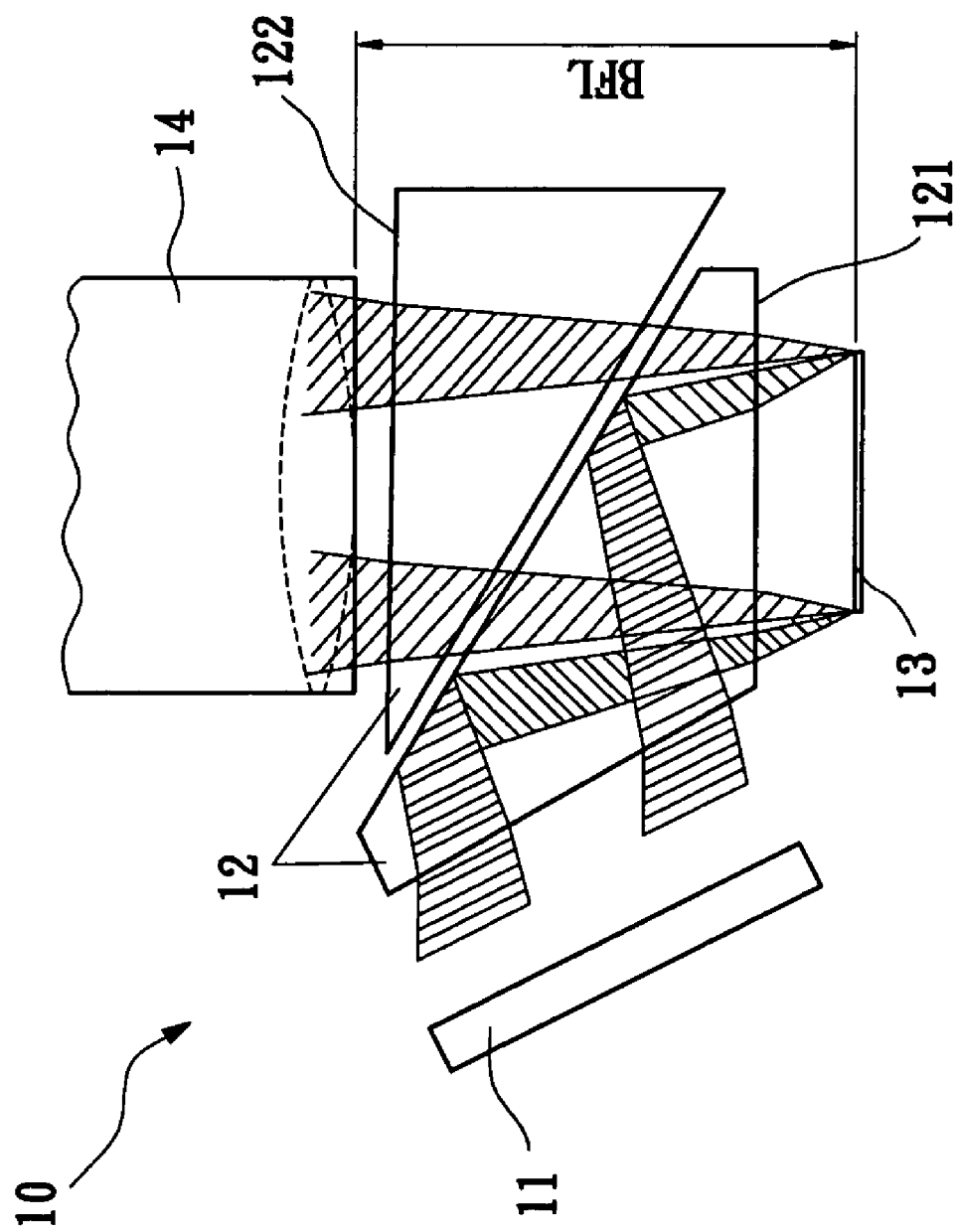
FIG. 1 is a schematic view, showing an optical system of a conventional projection display system.
Figure 2:
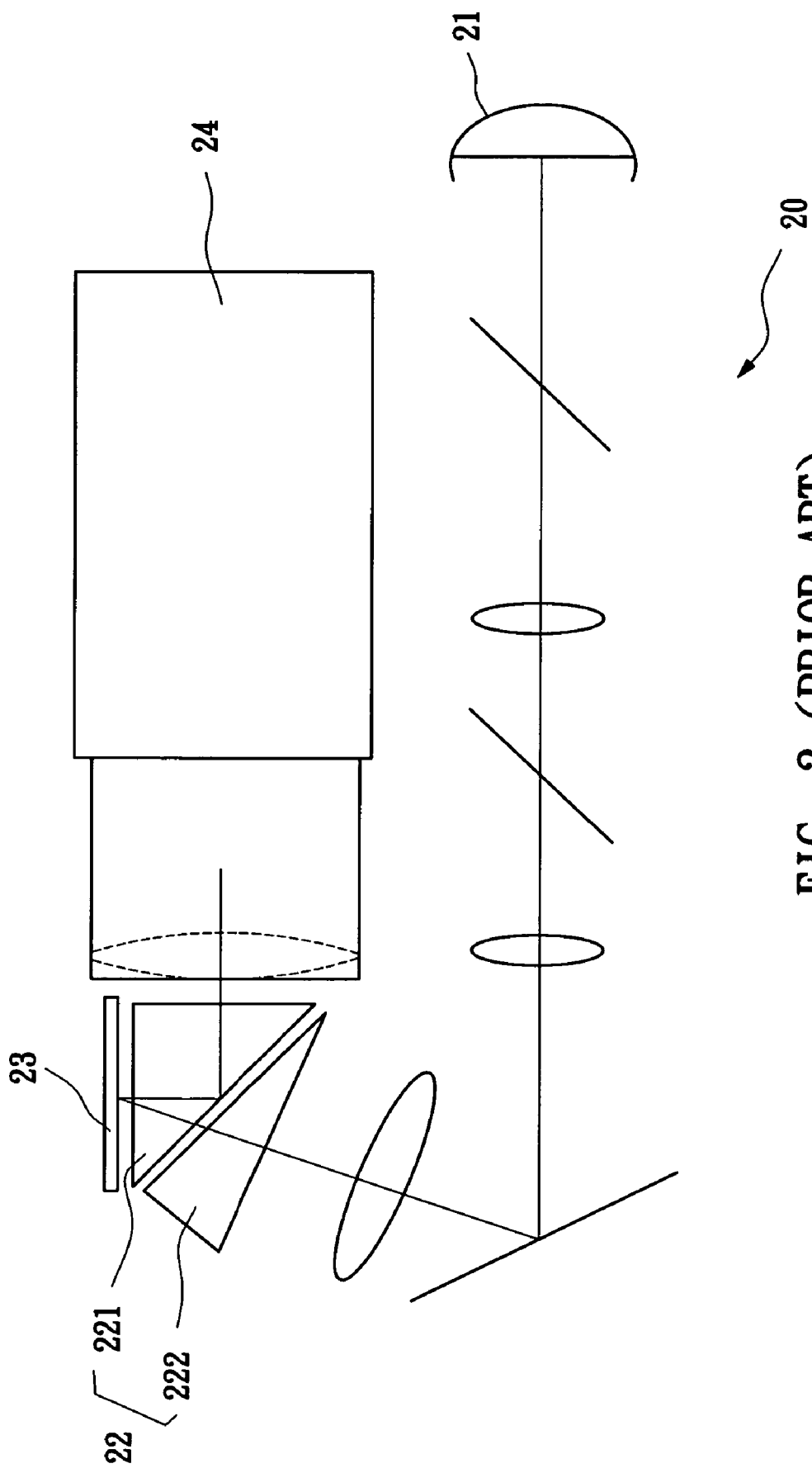
FIG. 2 is a schematic view, showing an optical system of another conventional projection display system.
Figure 3A:
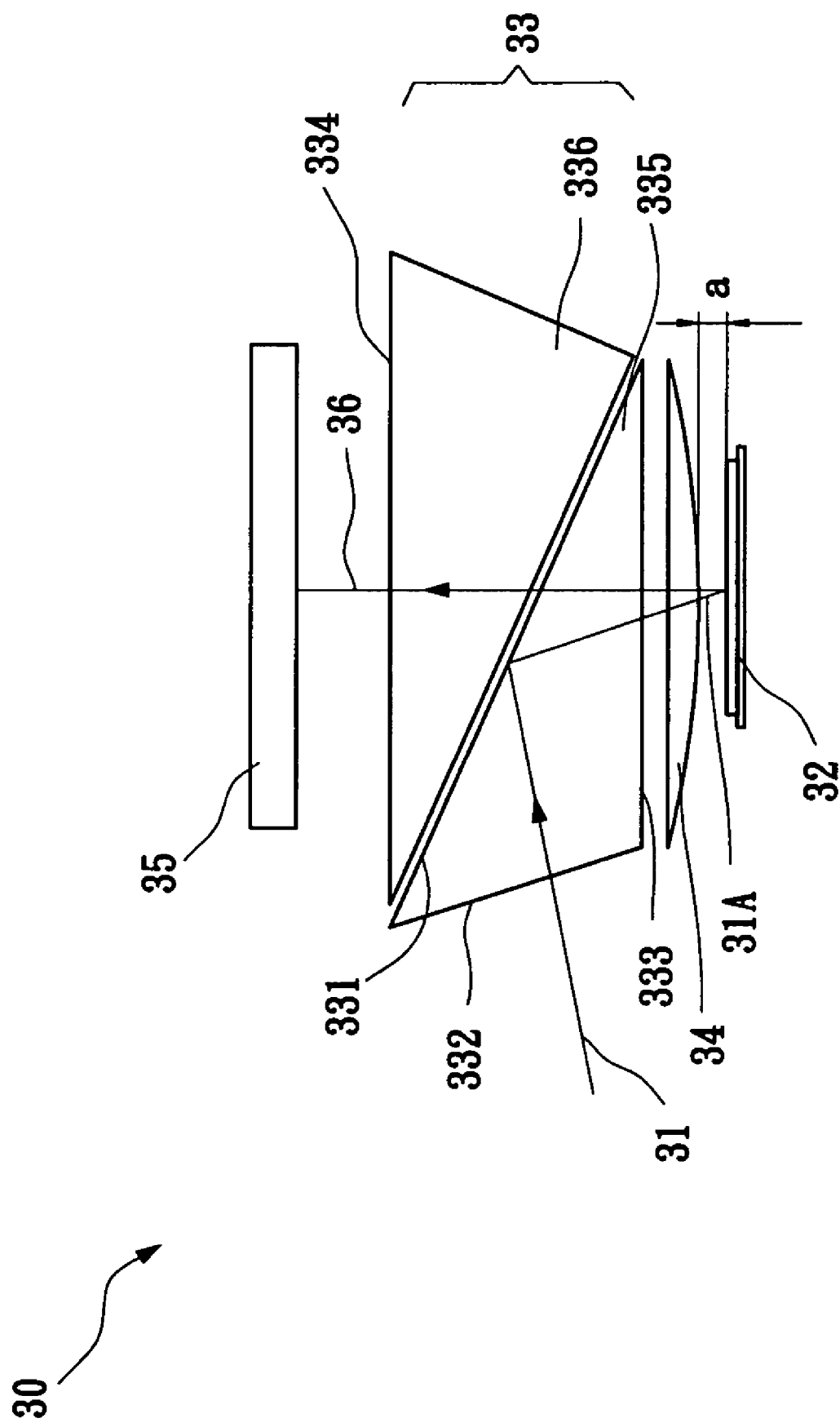
FIGS. 3A, 3B, 3C and 3D are schematic views, showing an optical system of a projection display system of a first embodiment according to the present invention.
Figure 3B:
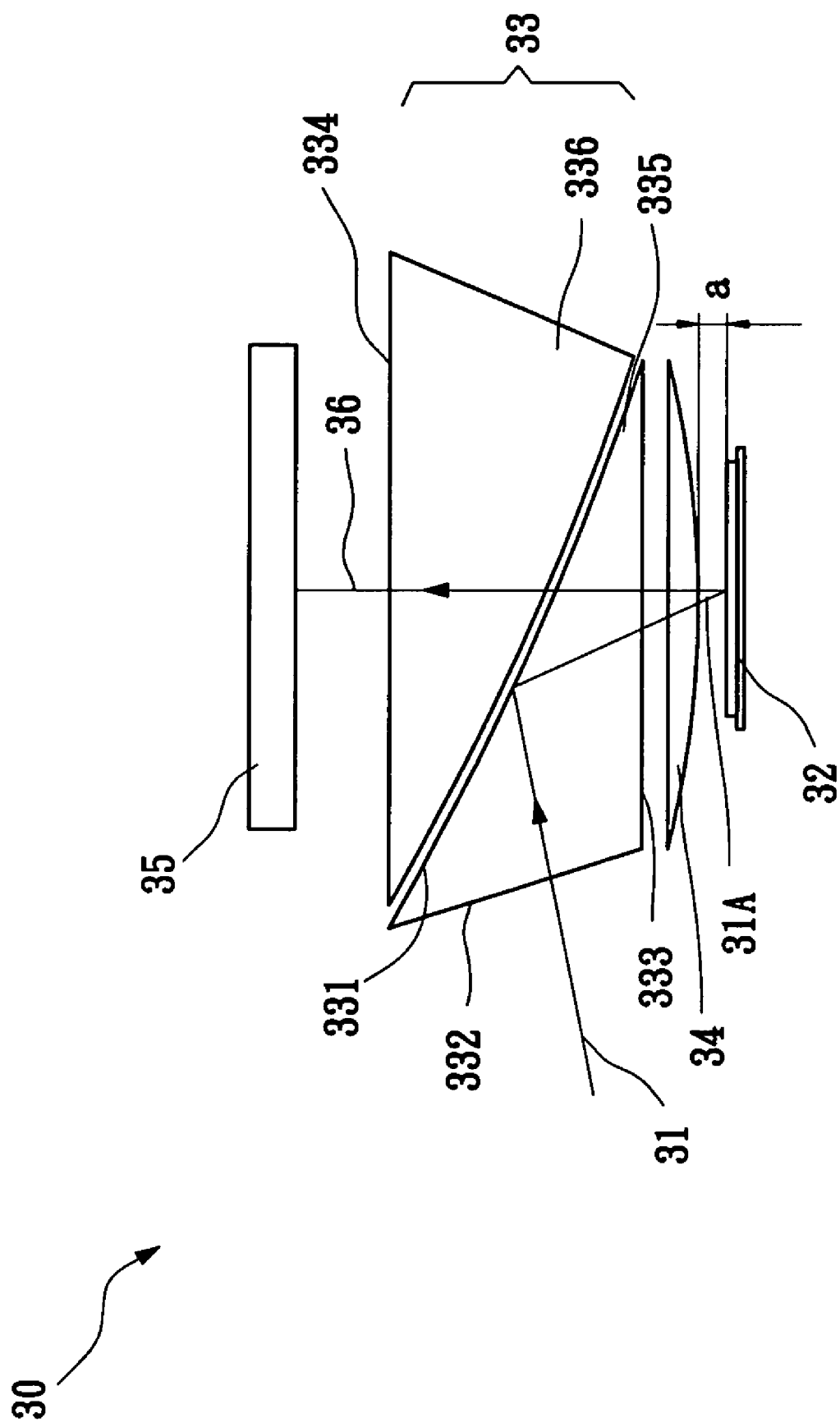

Please refer to FIG. 3A. A projection display system 30 comprises an illumination device (not shown), a reflective light valve 32, a prism assembly 33, a collimating means 34 and a projection lens 35, in which the illumination device provides an unparallel illumination beam 31. The prism assembly 33 is installed between the illumination device and the reflective light valve 32 and has a beam choosing surface 331, a first light incident surface 332, a first light emitting surface 333 and a second light emitting surface 334. The beam choosing surface 331 is used to reflect the illumination beam 31 from the illumination device incident into the prism assembly 33, and allows a modulated beam 36 reflected from the reflective light valve 32 to pass through it. The collimating means 34 is installed between the prism assembly 33 and the reflective light valve 32 to transform the unparallel illumination beam 31 incident into the prism assembly 33 to a parallel illumination beam 31A. The collimating means 34 is a lens or a diffractive optical element (DOE). The projection lens 35 is installed adjacent to the second light emitting surface 334, and a principal plane of the projection lens 35 is parallel to the reflective light valve 32. The reflective light valve 32 is installed adjacent to the first light emitting surface 333, and used for processing the parallel illumination beam 31A to generate the modulated beam 36. Here, The light valve 32 is a digital micromirror device (DMD).

The prism assembly 33 further comprises a first prism 335 and a second prism 336. The first light incident surface 332, the first light emitting surface 333 and the beam choosing surface 331 are connected together to construct the first prism 335. The beam choosing surface 331 and the second light emitting surface 334 are positioned on a surface adjacent to the second prism 336 and the beam choosing surface 331 is formed by two adjacent surfaces of the first prism 335 and the second prism 336 close together with an air gap. The beam choosing surface 331 is a plane (as FIG. 3A shows) or a curved surface (as FIG. 5B shows).

After the unparallel illumination beam 31 is incident into the first prism 335 of the prism assembly 33 from the first incident surface 332 and reflected via the beam choosing surface 331, it is passed through the collimating means 34 to transform to a parallel illumination beam 31A and is then incident on the reflective light valve 32 to generate a modulated beam 36 after the process of the reflective light valve 32. Thereafter, the modulated beam 36 is passed through the collimating means 34, the first emitting surface 333, the beam choosing surface 331 and the second light emitting surface 334 and projected into the projection lens 35. Finally, the projection lens 35 displays an image on a screen (not shown).

Because the collimating means 34 as a lens, is installed between the reflective light valve 32 and the prism assembly 33. A back focal length of the system is a distance between the collimating means 34 (i.e. a surface of the lens) to the surface of the light valve 33 (i.e. an image formation surface) such that the back focal length is allowed to shorten and the size of the projection lens 35 can be reduced. Besides, the modulated beam 36 reflected from the light valve 32 is converged through the collimating device 34 and then projected to the projection lens 35. It also reduces the size of the projection lens 35 and lowers the production cost. And, the collimating means 34 is utilized to replace the lens functions in the projection lens 35 or the illumination device so that the projection lens 35 or the illumination device is simplified.

Figure 3C:
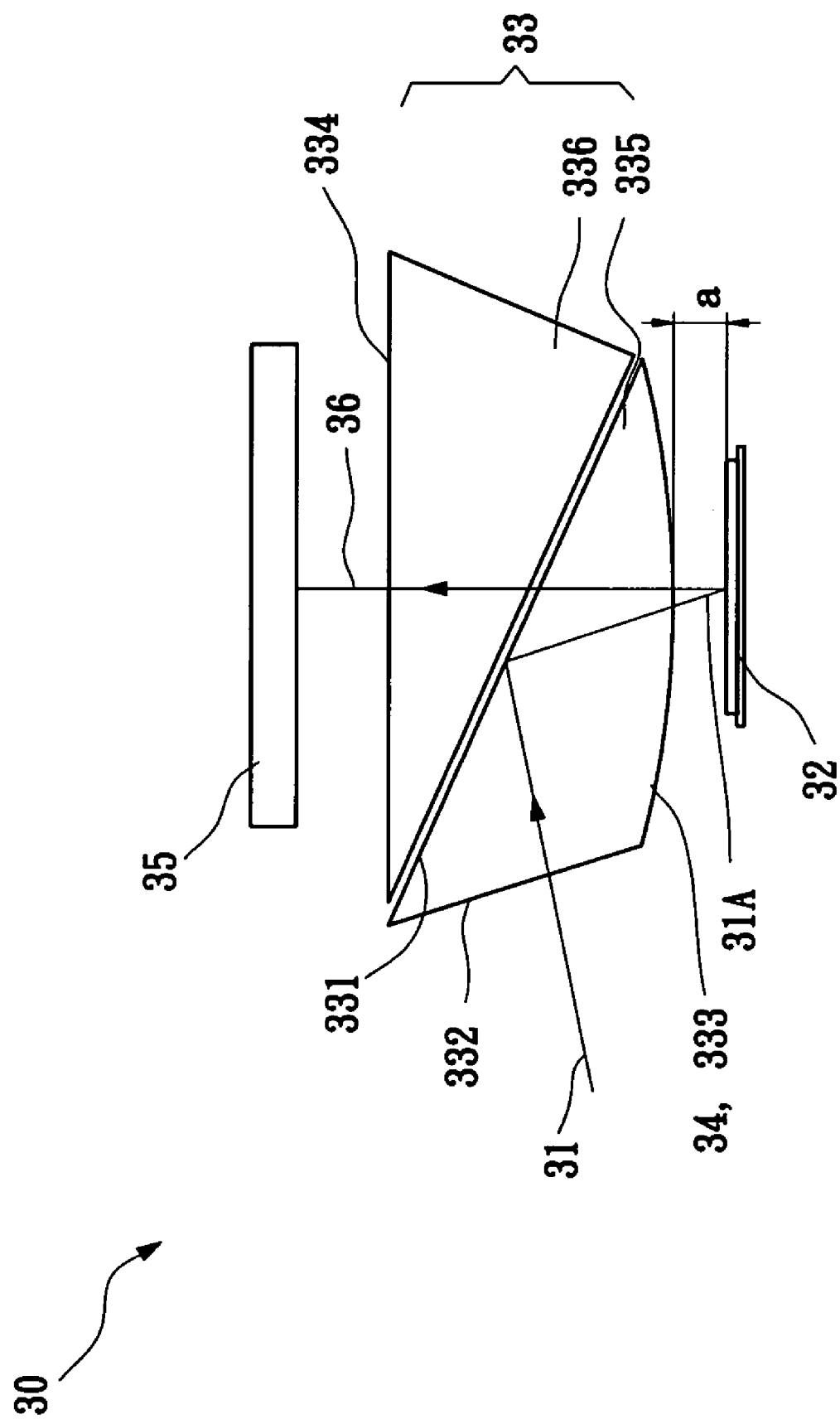
Figure 3D:
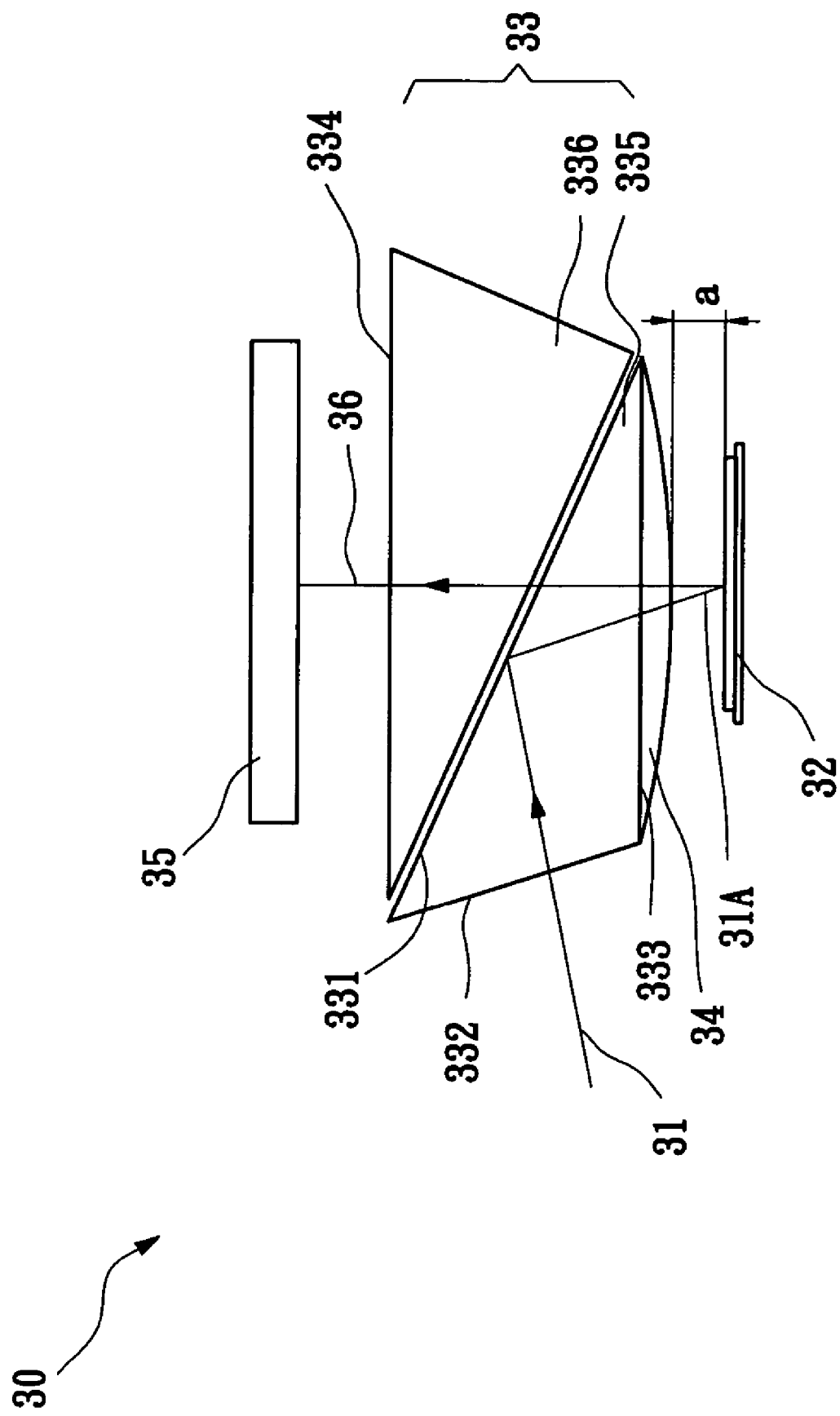

Please refer to FIG. 3C. The collimating means is formed integrally with the first prism 335 or formed by attaching a lens on the light emitting surface 333, as FIG. 3D shows.

The prism 33 and the collimating device 34 are also formed into one module with the projection lens 35 so as to simplify the number of components in the system and to fix the prism assembly 33 and the collimating means 34 through the housing of the projection lens 35.

Figure 5:
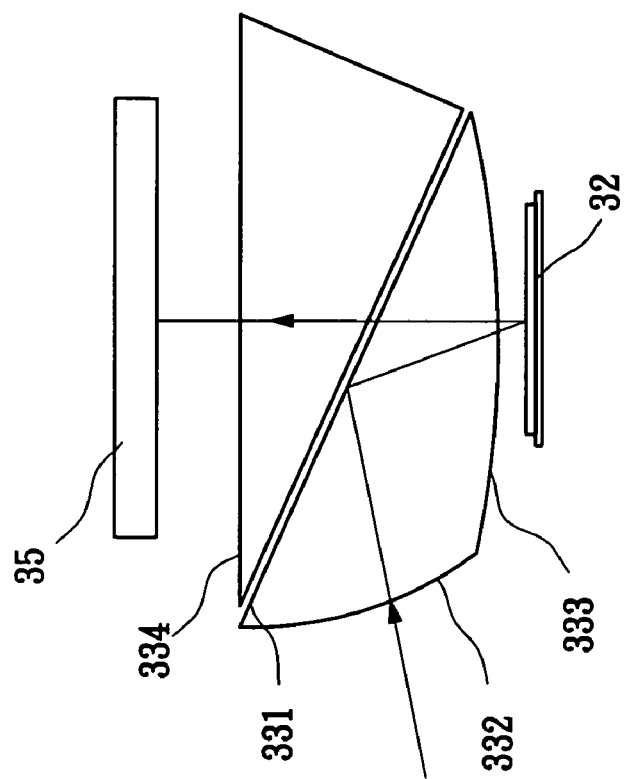
FIG. 5 is a schematic view, showing an optical system of a projection display system in which a first incident surface is a surface of a lens according to the present invention.
Figure 4:
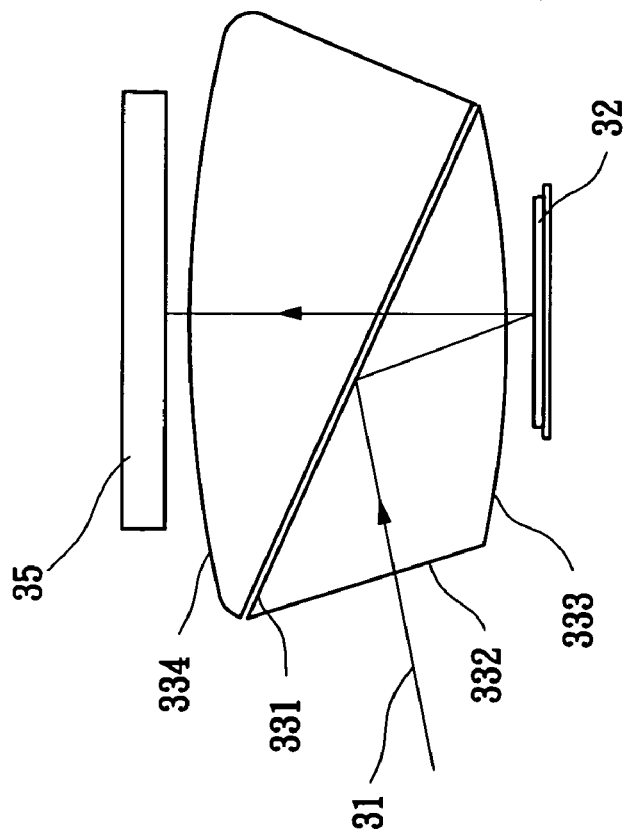
FIG. 4 is a schematic view, showing an optical system of a projection display system in which a second light emitting surface is a surface of a lens according to the present invention.

In addition, the second light emitting surface 334 is set to be an optical curved surface (as FIG. 4 shows) in this embodiment so as to simplify the number of the lens of the projection lens 35. Or the first light incident surface 334 is an optical curved surface (as FIG. 5 shows) in this embodiment so as to simplify the number of the lens of the illumination device. In this way, the projection lens 35 and the illumination device are compact.

Figure 6:
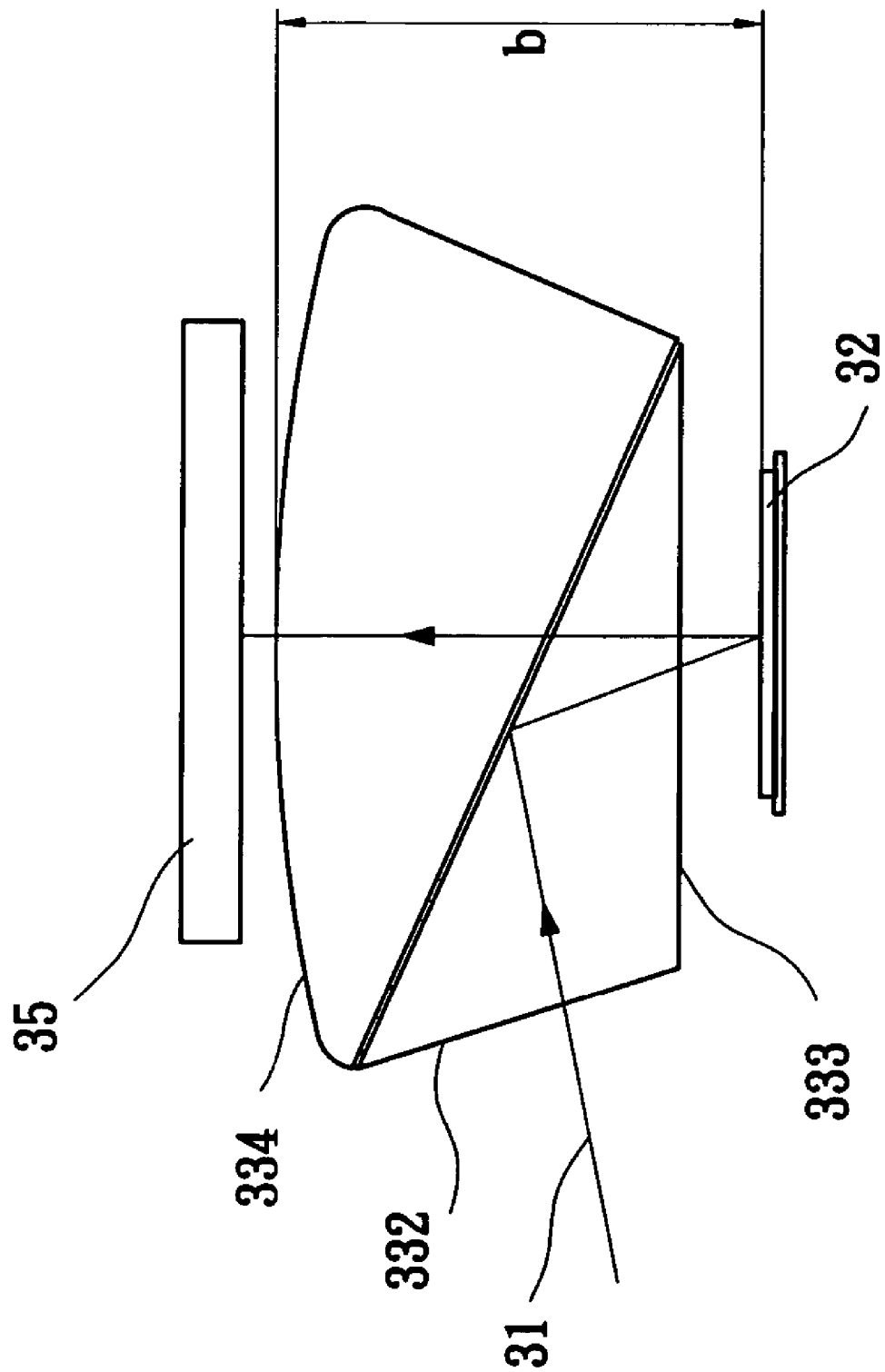
FIG. 6 is a schematic view, showing an optical system of a projection display system derived from a first embodiment of the present invention.

Moreover, please refer to FIG. 6. The first light emitting surface 333 in FIG. 3C is set to be a plane, and the second light emitting surface 334 is set to be an optical curved surface to allow the optical curved surface (i.e. the surface of the lens) to be closer to the surface of the light valve 32 (i.e. the image formation surface) so that a back focal length b is a distance between the optical curved surface and the surface of the light valve 32 (i.e. the image formation surface). In this way, the back focal length b of the system is shortened, and the size of the projection lens and the number of the lenses is reduced.

The Second Embodiment

Figure 7:
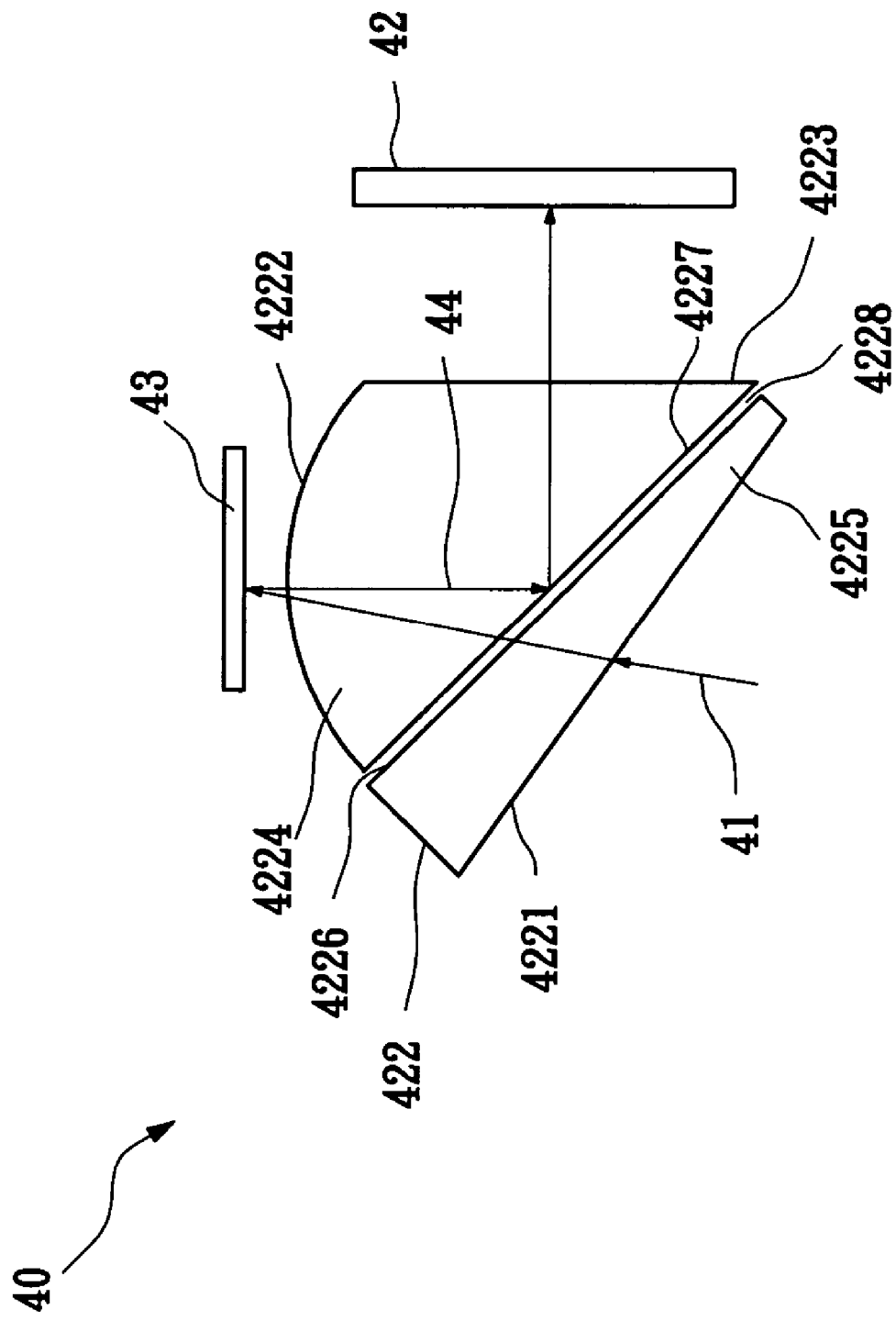
FIG. 7 is a schematic view, showing an optical system a projection display system of a second embodiment according to the present invention.

Please refer to FIG. 7. A projection display system 40 comprises an illumination device (not shown), a prism assembly 422, a projection lens 42 and a light valve 43, in which the illumination device provide an illumination beam 41. The prism assembly 422 has a first light incident surface 4221, a first light emitting surface 4222 and a second light emitting surface 4223 and the first light emitting surface 4222 is an optical curved surface. The first light emitting surface 4222 and the second light emitting surface 4223 are connected. A tangent plane of the first light-emitting surface 4222 and the second light-emitting surface 4223 are disposed perpendicularly to each other. The prism assembly 422 is installed inside or outside of the projection lens 42. When the prism 422 is installed inside of the projection lens, the number of the components is reduced. The projection lens 42 is installed adjacent to the second light emitting surface 4223, the light valve 43 is installed adjacent to the first light emitting surface 4222 and used for processing the illumination beam 41 to generate a modulated beam 44, the light valve 43 is a digital micromirror device (DMD).

The prism assembly 422 mentioned above further comprises a right-angled prism 4224, a wedge prism 4225, a third light emitting surface 4226 and a second total reflection surface 4227, in which the first light incident surface 4221 and the third light emitting surface 4226 are positioned on two opposite sides of the wedge-shaped prism 4225 and the first light emitting surface 4222, the second light emitting 4223 and the second total reflection surface 4227 are connected to one another to construct the right-angled prism 4224. The second total reflection surface 4227 is a hypotenuse of the right-angled prism 4224, and the third light emitting surface 4226 and the second total reflection surface 4227 are connected to each other and have an air layer 4228, i.e. a beam choosing surface is formed between them.

Furthermore, the illumination beam 41 enters the wedge prism 4225 of the prism assembly 422 from the first light emitting surface 4221, and is then passed through the third light emitting surface 4226, the second total reflection surface 4227 and the first light emitting surface 4222 and projected onto the light valve 43. Further, the illumination beam 41 is transformed to a modulated beam 44 after it is processed through the light valve 43. The modulated beam 44 is passed through the first light emitting surface 4222 and incident into the right-angled prism 4224. The modulated beam 44 is reflected through the second total reflection surface 4227 and then passed through the second light emitting surface 4223 to project into an image formation set 421. Finally, the image formation set 421 displays images on a screen (not shown).

Because the first light emitting surface 4222 of the prism assembly 422 is set to be an optical curved surface to cause the back focal length of the system to be a distance from the first light emitting surface 4222 (i.e. the surface of the lens) to the surface of the light valve 43 (i.e. the image formation surface). This allows the back focal length of the system to be shortened and the size of the projection lens 42 to be reduced.

Figure 8:
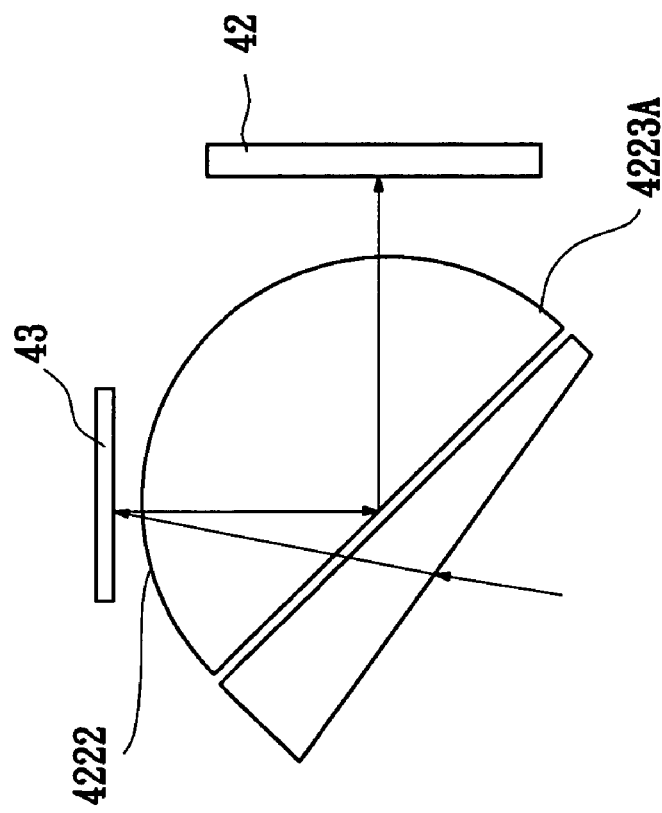
FIG. 8 is schematic view, showing an optical system of a projection display system in which a first light emitting surface and a second light emitting surface are the surfaces of the lenses according to the present invention.

Besides, a second light emitting surface 4223A is also set to be an optical curved surface in this embodiment, as FIG. 8 shows, so as to reduce the number of the lens of the image formation set 421, and the second light emitting surface 4223A is connected with the first light emitting surface 4222 to form a hemispherical surface so as to utilize simply processed spherical surface manufacturing to make the prism assembly 422.

Figure 9:
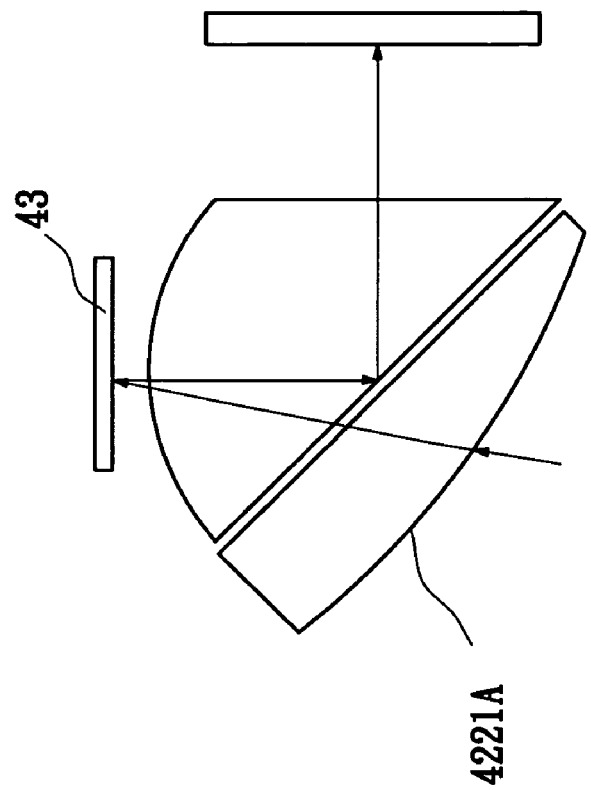
FIG. 9 is a schematic view, showing an optical system of a projection display system in which a first light emitting surface and a first light incident surface are the surfaces of the lenses according to the present invention.

Moreover, a first light incident surface 4221A is set to be an optical curved surface (as FIG. 9 shows) to simplify the number of the lenses of the illumination device. In this way, the illumination device is compacted.

Figure 10:
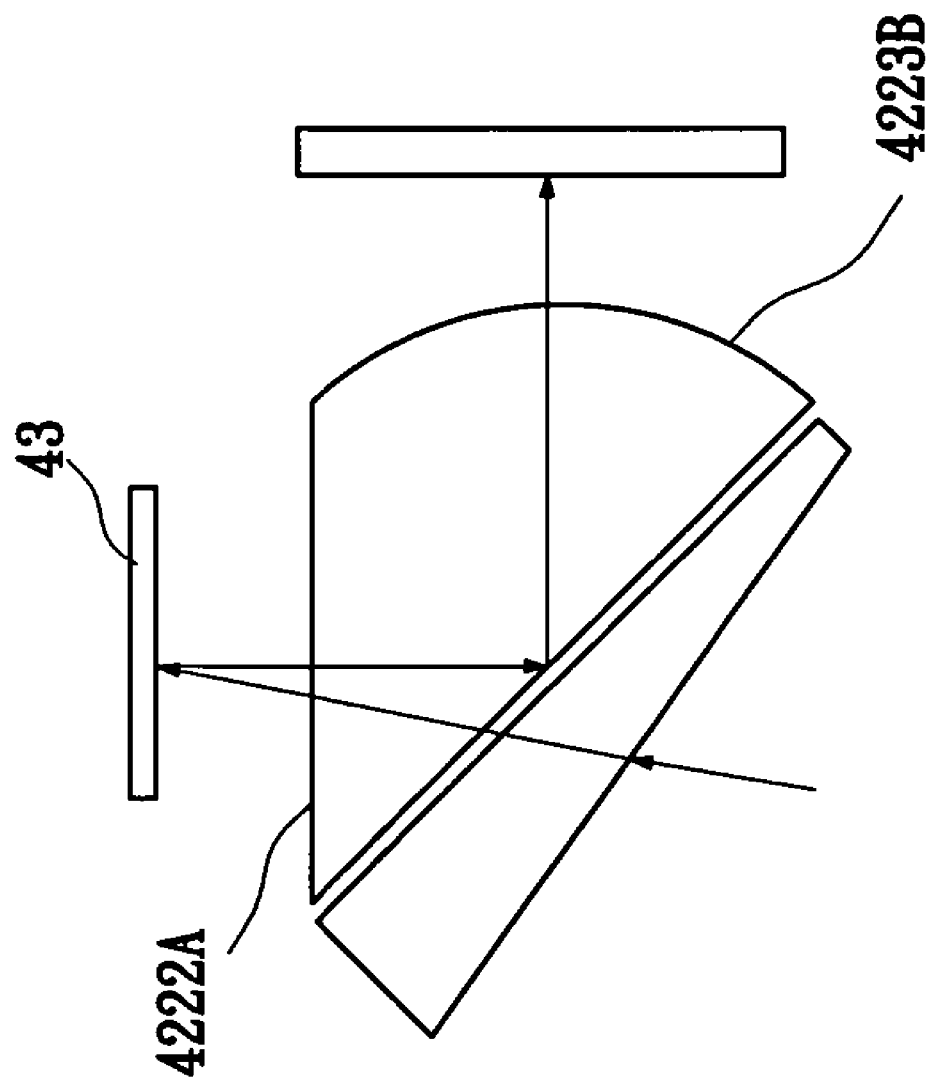
FIG. 10 is a schematic view, showing an optical system of a projection display system derived from a second embodiment of the present invention.

In addition, please refer to FIG. 10. The first light emitting surface 4222 in FIG. 7 is set to be a plane 4222A and the second light emitting surface 4223 is set to be an optical curved surface 4223B to cause the optical curved surface (the surface of the lens) of the system to be closer to the surface of the light valve (i.e. the image formation surface) so that the back focal length is shortened.

The Third Embodiment

Figure 11:
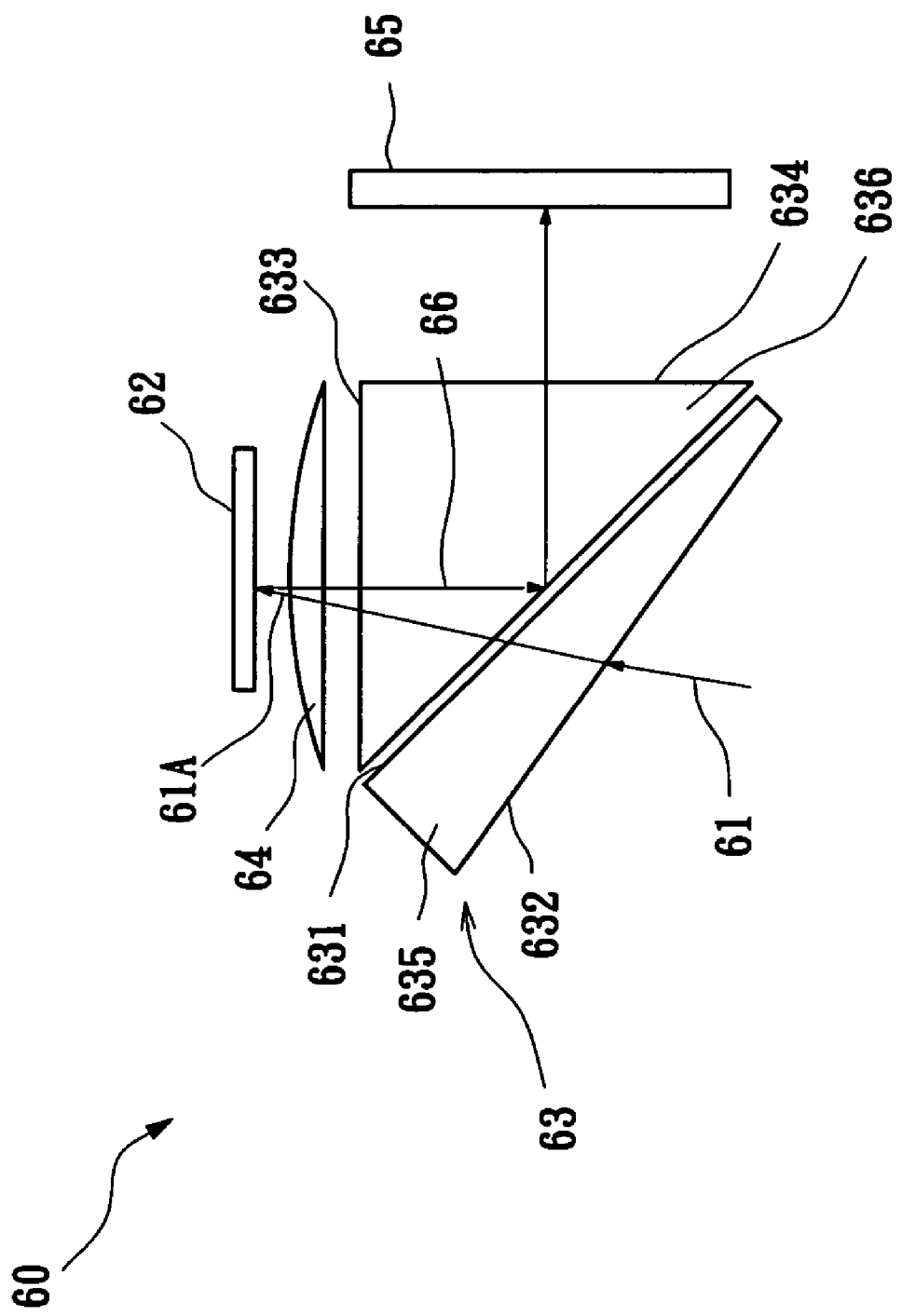
FIG. 11 is a schematic view, showing an optical system of a projection display system of a third embodiment according to the present invention.

Please refer to FIG. 11. A projection display system 60 comprises an illumination device (not shown in the figure), a reflective light valve 62, a prism assembly 63, a collimating means 64 and a projection lens 65, in which the illumination device provides an unparallel illumination beam 61. The prism assembly 63 is installed between the illumination device and the reflective light valve 62 and has a beam choosing surface 631, a first light incident surface 632, a first light emitting surface 633 and a second light emitting surface 634. The beam choosing surface 631 allows the illumination beam 61, from the illumination device and incident into the prism assembly 63 be passed through and a modulated beam 66 reflected from the reflective light valve 62 to be reflected. The collimating means 64 is installed between the prism assembly 63 and the reflective light valve 62 to transform the unparallel illumination beam 61 incident into the prism assembly 63 to a parallel illumination beam 61A, the collimating means 64 is a lens or a diffractive optical element (DOE). The projection lens 65 is installed adjacent to the second light emitting surface 634 and a principal plane of the projection lens 65 is perpendicular to the reflective light valve 62. The reflective light valve 62 is installed adjacent to the first light emitting surface 633 and used for processing the illumination beam 61A to generate a modulated beam 66, the light valve is a digital micromirror device (DMD).

The prism assembly can further comprises a wedge prism 635 and a right-angled prism 636, in which a first light incident surface 632 and the beam choosing surface 631 are positioned on two surfaces of the wedge prism 635 not adjacent to each other, the beam choosing surface 631, a first light emitting surface 633 and a second light emitting surface 634 are constructed to be a right-angled prism 636, and the choosing surface 631 is formed by attaching two surfaces of the wedge prism 635 and the right-angled prism 636 together with an air gap.

Furthermore, the unparallel illumination beam 61 is incident into the wedge prism 635 of the prism assembly 63 from the first light incident surface 632 and then passed through the beam choosing surface 631, the first light emitting surface 633 and the collimating means 64 to transform to a parallel illumination beam 61A, and incident on the reflective light valve 62 to generate a modulated beam 66 after the process of the reflective light valve 62. Thereafter, the modulate beam 66 is passed through the collimating means 64 and the first light emitting surface 633 and then passed through the second light emitting surface 634 to project into the projection lens 65 after it is reflected by the beam choosing surface 631. Finally, the projection lens 65 display images onto a screen (not shown).

Because the collimating means 64 of a lens is installed between the reflective light valve 62 and the prism assembly 63, the back focal length of the system is shortened and the size of the projection lens is reduced. Besides, the modulated beam 66 reflected from the light valve 62 is converged through the collimating means 64 and then projected into the projection lens 65, not only the size of the projection lens 65 is reduced and the production cost is lowered, but also the collimating means 64 is utilized to replace the projection lens 65 or the functions of the lens in the illumination device so that the projection lens 65 or the illumination device is simplified.

The Fourth Embodiment

Figure 12:
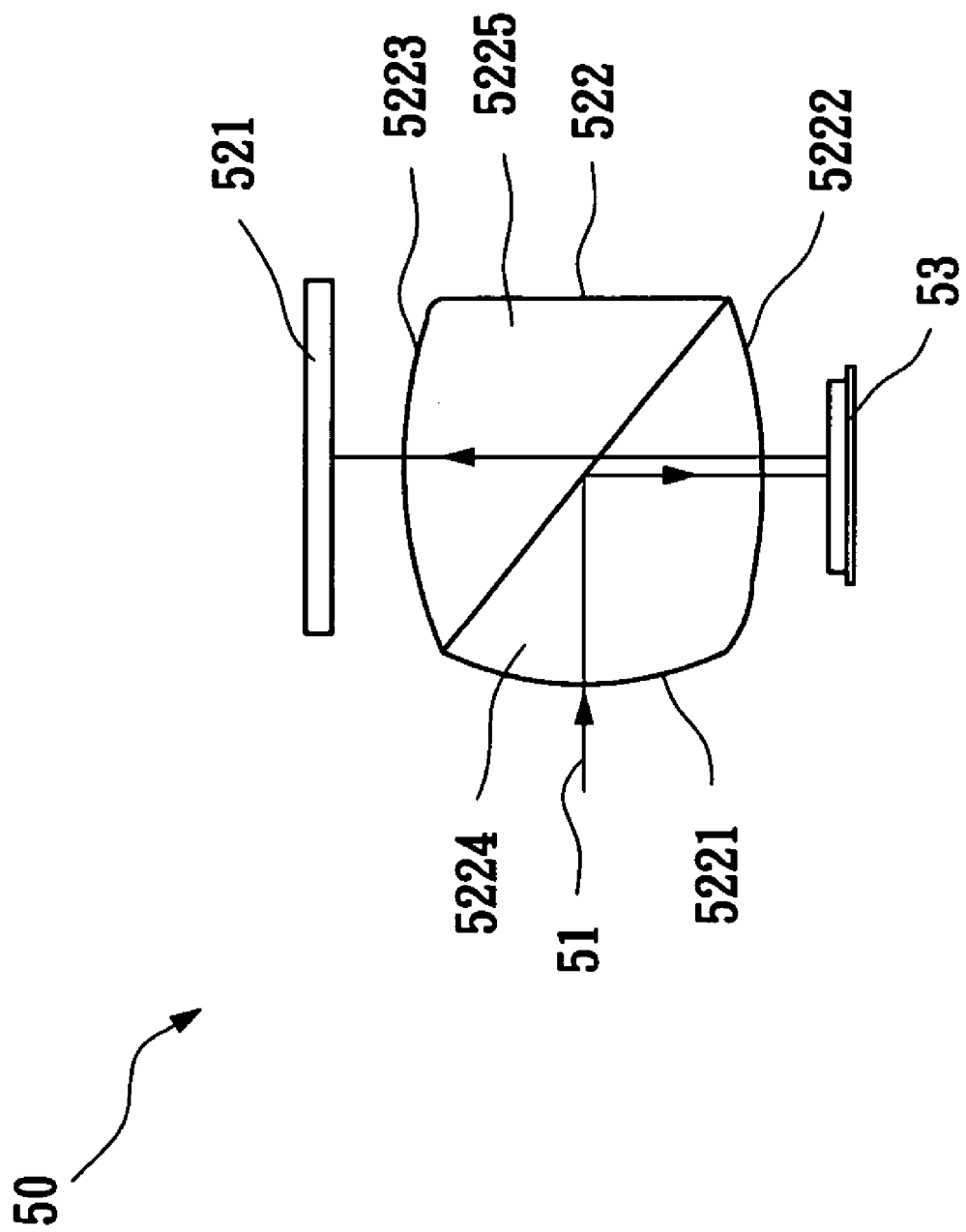
FIG. 12 is a schematic view, showing an optical system of a projection display system of a fourth embodiment according to the present invention.

Please refer to FIG. 12. The fourth embodiment is a projection display system 50 applied in single sheet type liquid crystal on silicon (LCOS) panel, it utilizes a prism assembly 522 with a polarization beam splitter (PBS) to separate an illumination beam incident into the LCOS panel and an illumination beam reflected from the LCOS panel. The prism assembly 522 is formed by two isosceles right-angled prisms 5224 and 5225 together which are connected by two hypotenuses of themselves and two legs of the right-angled prism 5224 respectively are a first light incident surface 5221 and a first light emitting surface 5222. One leg of the right-angled prism 5225 corresponding to the first light emitting surface 5222 is a second light emitting surface 5223. The first light incident surface 5221, the first light emitting surface 5222 and the second light emitting surface 5223 are set to be optical curved surfaces. A light valve 53 is installed adjacent to the first light emitting surface 5222 and an image formation set 521 is installed adjacent to the second light emitting surface 5223. When a nonlinear polarized illumination beam 51 is incident into the prism assembly 522 from the first light incident surface 5221, the prism assembly 522 reflects the S polarized light (a plane perpendicular to the incident beam) and let P polarized light (a plane level to the incident beam) pass, or the prism assembly 5222 reflects the P polarized light (the plane level to the incident beam) and let the S polarized light (the plane perpendicular to the incident beam) pass so as to obtain a polarized light. The polarized light is reflected by the light valve 53 and passed through the image formation set 521 to project onto a screen (not shown in the figure).

Because parts of surfaces of the prism assembly 522 in this embodiment are optical curved surface, the back focal length is shortened and the illumination device and the image formation set is simplified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection display system, comprising:
   an illumination device, providing an unparallel illumination beam;
   a reflective light valve, used for processing said illumination beam to generate a modulated beam;
   a prism assembly, installed between said illumination device and said reflective light valve, and having a curved beam choosing surface, said curved beam choosing surface reflecting said illumination beam incident into said prism assembly from said illumination device, and allowing said modulated beam reflected by said reflective light valve to be passed through; and
   a collimating means, installed between said prism assembly and said reflective light valve to transform said unparallel illumination beam incident into said prism assembly to a parallel illumination beam;
   said illumination beam being incident into said prism assembly, passed through said collimating means after being reflected by said curved beam choosing surface and then incident on said reflective light valve, said modulate beam being generated after the process of said reflective light valve, finally, said modulated beam being passed through said collimating means and said curved beam choosing surface and projected into a projection lens.

2. The projection display system according to claim 1, wherein said collimating means is a lens or a diffractive optical element.

3. The projection display system according to claim 1, wherein said collimating means is installed on said prism assembly.

4. The projection display system according to claim 3, wherein said collimating means has an optical curved surface.

5. The projection display system according to claim 3, wherein said collimating means is formed integrally with said prism assembly.

6. The projection display system according to claim 3, wherein said collimating means has a spherical surface.

7. The projection display system according to claim 1, wherein said reflective light valve is installed parallel to a principal plane of said projection lens.

8. The projection display system according to claim 1, wherein said prism assembly and said collimating means are installed in said projection lens to form a module.

9. The projection display system according claim 1, wherein said reflective light valve is a liquid crystal on silicon (LCOS), and said prism assembly has a polarization beam splitter (PBS).

10. A projection display system, comprising:
    an illumination device, providing an unparallel illumination beam;
    a reflective light valve, for processing said illumination beam to generate a modulated beam;
    a prism assembly, installed between said illumination device and said reflective light valve, and having a curved beam choosing surface, said illumination beam incident into said prism assembly from said illumination device being allowed to pass through said curved beam choosing surface, and said curved beam choosing surface reflecting said modulated beam reflected by said reflective light valve; and
    a collimating means, installed between said prism assembly and said reflective light valve to transform said unparallel illumination beam incident into said prism assembly to a parallel illumination beam, said unparallel illumination beam being incident into said prism assembly, passed through said curved beam choosing surface and said collimating means then incident on said reflective light valve, said modulated beam being generated after the process of said reflective light valve, finally, said modulated beam being passed through said collimating means and then reflected by said curved beam choosing surface to project into a projection lens.

11. The projection display system according to claim 10, wherein said collimating means is a lens or a diffractive optical element.

12. The projection display system according to claim 10, wherein said collimating means is installed on said prism assembly.

13. The projection display system according to claim 12, wherein said collimating means has an optical curved surface.

14. The projection display system according to claim 12, wherein said collimating means is formed integrally with said prism assembly.

15. The projection display system according to claim 12, wherein said collimating means has a spherical surface.

16. The projection display system according to claim 10, wherein said reflective light valve is installed perpendicular to a principal plane of said projection lens.

17. The projection display system according to claim 10, wherein said prism assembly and said collimating means are installed in said projection lens to form a module.

* * * * *